US007632320B2

(12) United States Patent
Tonkovich et al.

(10) Patent No.: US 7,632,320 B2
(45) Date of Patent: *Dec. 15, 2009

(54) CHEMICAL REACTOR FOR GAS PHASE REACTANT CATALYTIC STEAM REFORMING REACTIONS

(75) Inventors: Anna Lee Y. Tonkovich, Pasco, WA (US); Yong Wang, Richland, WA (US); Sean P. Fitzgerald, Richland, WA (US); Jennifer L. Marco, Pasco, WA (US); Gary L. Roberts, West Richland, WA (US); David P. Vanderwiel, Richland, WA (US); Robert S. Wegeng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/282,423

(22) Filed: Nov. 18, 2005

(65) Prior Publication Data

US 2006/0067861 A1    Mar. 30, 2006

Related U.S. Application Data

(60) Continuation of application No. 10/264,792, filed on Oct. 4, 2002, now Pat. No. 6,984,363, which is a division of application No. 09/375,614, filed on Aug. 17, 1999, now Pat. No. 6,488,838.

(51) Int. Cl.
*C10J 3/20* (2006.01)
*B01J 8/08* (2006.01)

(52) U.S. Cl. .................. 48/63; 48/127.7; 422/190; 422/191; 422/195; 422/217; 422/218

(58) Field of Classification Search ............. 422/190, 422/191, 193, 195, 217, 218; 48/63, 127.7, 48/76
See application file for complete search history.

(56) References Cited

U.S. PATENT DOCUMENTS

| | | | |
|---|---|---|---|
| 4,795,618 | A | 1/1989 | Laumen |
| 4,801,620 | A | 1/1989 | Fujitani et al. |
| 5,075,277 | A | 12/1991 | Saiai et al. |
| 5,270,127 | A | 12/1993 | Koga et al. |
| 5,324,452 | A | 6/1994 | Allam et al. |
| 5,366,719 | A | 11/1994 | van Wingerden et al. |
| 5,417,938 | A | 5/1995 | Shelden et al. |
| 5,512,250 | A | 4/1996 | Betta et al. |
| 5,518,697 | A | 5/1996 | Dalla Betta et al. |

(Continued)

*Primary Examiner*—N. Bhat
(74) *Attorney, Agent, or Firm*—Derek H. Maughan; Frank Rosenberg

(57) ABSTRACT

The present invention is a chemical reactor and method for catalytic chemical reactions having gas phase reactants. The chemical reactor has reactor microchannels for flow of at least one reactant and at least one product, and a catalyst material wherein the at least one reactant contacts the catalyst material and reacts to form the at least one product. The improvement, according to the present invention is: the catalyst material is on a porous material having a porosity that resists bulk flow therethrough and permits molecular diffusion therein. The porous material further has a length, a width and a thickness, the porous material defining at least a portion of one wall of a bulk flow path through which the at least one reactant passes.

7 Claims, 3 Drawing Sheets

U.S. PATENT DOCUMENTS

| | | |
|---|---|---|
| 5,534,328 A | 7/1996 | Ashmead et al. |
| 5,609,834 A | 3/1997 | Hamada et al. |
| 5,811,062 A | 9/1998 | Wegeng et al. |
| 5,846,494 A | 12/1998 | Gaiser |
| 5,858,314 A | 1/1999 | Hsu et al. |
| 5,861,137 A | 1/1999 | Edlund |
| 5,997,594 A * | 12/1999 | Edlund et al. .................. 48/76 |
| 6,036,927 A | 3/2000 | Chatterjee et al. |
| 6,056,932 A | 5/2000 | von Hippel et al. |
| 6,140,266 A | 10/2000 | Corrigan et al. |
| 6,143,943 A | 11/2000 | Oroskar et al. |
| 6,159,358 A | 12/2000 | Mulvaney et al. |
| 6,180,846 B1 | 1/2001 | Dandekar et al. |
| 6,193,501 B1 | 2/2001 | Masel et al. |
| 6,203,587 B1 | 3/2001 | Lesieur et al. |
| 6,211,255 B1 | 4/2001 | Schanke et al. |
| 6,262,131 B1 | 7/2001 | Arcuri et al. |
| 6,265,451 B1 | 7/2001 | Zhou et al. |
| 6,413,449 B1 | 7/2002 | Wieland et al. |
| 6,451,864 B1 | 9/2002 | Wang et al. |
| 6,491,880 B1 | 12/2002 | Wang et al. |
| 6,537,506 B1 | 3/2003 | Schwalbe et al. |
| 6,558,634 B1 | 5/2003 | Wang et al. |
| 6,616,909 B1 | 9/2003 | Tonkovich et al. |
| 6,660,237 B2 * | 12/2003 | Wang et al. .................. 422/222 |
| 6,680,044 B1 | 1/2004 | Tonkovich et al. |
| 6,749,817 B1 | 6/2004 | Mulvaney et al. |
| 6,750,258 B2 | 6/2004 | Wang et al. |
| 6,936,237 B2 | 8/2005 | Wang et al. |
| 6,982,287 B2 | 1/2006 | Wang et al. |
| 6,984,363 B2 * | 1/2006 | Tonkovich et al. .......... 422/173 |
| 7,045,114 B2 * | 5/2006 | Tonkovich et al. .......... 423/659 |
| 7,045,486 B2 | 5/2006 | Wang et al. |
| 7,084,180 B2 | 8/2006 | Wang et al. |
| 7,125,540 B1 * | 10/2006 | Wegeng et al. .............. 423/650 |
| 7,270,905 B2 * | 9/2007 | Wegeng et al. ................. 429/26 |
| 7,288,231 B2 * | 10/2007 | Tonkovich et al. .......... 422/177 |
| 2001/0016188 A1 | 8/2001 | Haga et al. |
| 2001/0021469 A1 | 9/2001 | Kaneko et al. |
| 2002/0051741 A1 | 5/2002 | Abe et al. |

\* cited by examiner

CHEMICAL REACTOR FOR GAS PHASE REACTANT CATALYTIC STEAM REFORMING REACTIONS

RELATED APPLICATIONS

This application is a continuation of U.S. Patent application Ser. No. 10/264,792 filed Oct. 04, 2002, now U.S. Pat. No. 6,984,363, which was a divisional of U.S. patent application Ser. No. 09/375,614 filed Aug. 17, 1999, now U.S. Pat. No. 6,488,838.

FIELD OF THE INVENTION

The present invention is a chemical reactor and method for gas phase reactant catalytic reactions.

As used herein, the term "molecular diffusion" is used in its classic sense of the transfer of mass based upon Brownian motion between adjacent layers of fluid in laminar, transition, or turbulent flow, and includes transfer of mass between adjacent layers of fluid that are stagnant.

As used herein, the term "Knudsen diffusion" means Knudsen flow, or free molecule flow, wherein the mean free path of the molecules is long compared to a characteristic dimension of the flow field, for example the pore size of a material through which the molecules are diffusing.

BACKGROUND OF THE INVENTION

Many catalytic reactions begin with gas phase reactants, for example steam reforming, partial oxidation, water gas shift and others. However, equipment, specifically reactor volume is generally large because of mass and heat transfer limitations. Conventional reactors are operated with a gas hourly space velocity from about 1,000 to about 10,000 $hr^{-1}$. In other words, residence time is greater than 1 second because of the heat and mass transfer limitations.

These problems have been recognized and research is considering microchannel reactors because the microchannels have been shown to offer less resistance to heat and mass transfer thus creating the opportunity for dramatic reductions in process hardware volume. Several types of microchannel reactors have been described in the literature.

Franz et al., 1998 and Lowe et al., 1998 report applying a coating of the active catalyst (such as Pt, Ag, or other noble metal) directly to the microchannel wall. This approach has the disadvantage that the only usable surface area is that of the microchannel wall.

Weissmeier and Honicke, 1998a-b report creating a porous interface directly from the microchannel wall material onto which the catalyst is deposited. An aluminum wall was anodized to create the porous alumina interface that had an average pore diameter in the nanometer size range (permitting only Knudsen diffusion) and a thickness in the range of tens of microns. Disadvantages of this approach include that it is only applicable for aluminum, and limited surface area. The anodized walls formed a two-dimensional array of 700 identical microchannels.

Tonkovich/Zilka et al., 1998 reported packing catalytic powders directly within an array of parallel microchannels as a packed microbed. A disadvantage was a tendency to create relatively large pressure drops by forcing the fluid to flow through the packed microbed.

Tonkovich/Jimenez et al., 1998 reported placing a palladium catalyst supported on a metallic nickel foam within a cavity (more than an order of magnitude larger than a microchannel) and then sending the effluent to an array of microchannels to exchange heat. Again, a disadvantage was large pressure drop through the metal foam.

Hence, there is a need for a chemical reactor for catalytic reactions with fast kinetics that has a small reactor volume with a low pressure drop.

BACKGROUND REFERENCES

Franz, A. J., Quiram, D., Srinivasan, R., Hsing, I-M., Firebaugh, S. L., Jensen, K. F., and M. A. Schmidt, 1998, New Operating Regimes and Applications Feasible with Microreactors, Proceedings of the Second International Conference on Microreaction Technology, New Orleans. La., p 33-38.

Lowe, H., Ehrfeld, W., Gebauer, K., Golbig, K., Hausner, O., Haverkamp, V., Hessel, V., and Richter, Th., 1998, Micrcreactor Concepts for Heterogeneous Gas Phase Reactions, Proceedings of the Second International Conference of Microreaction Technology, March 1998, New Orleans, La., p. 63-74.

Tonkovich, A. Y., Zilka, J. L., Powell, M. R., and C. J. Call, 1998, The Catalytic Partial Oxidation of Methane in a Microchannel Chemical Reactor, Proceedings of the Second International Conference of Microreaction Technology, March 1998, New Orleans, La., p. 45-53.

Tonkovich, A. Y., Jimenez, D. M., Zilka, J. L., LaMont, M., Wang, Y., and R. S. Wegeng, 1998, Microchannel Chemical Reactors for Fuel Processing, Proceedings of the Second International Conference of Microreaction Technology, March 1998, New Orleans, La, p. 186-195.

Weissmeier, G., and Honicke, D., 1998a, Strategy for the Development of Micro Channel Reactors for Heterogeneously Catalyzed Reactions, Proceedings of the Second International Conference on Microreaction Technology, New Orleans, La., p. 24-32.

Weissmeier, G., and Honicke, D., 1998b, Microreaction Technology: Development of a microchannel reactor and its application in heterogeneously catalyzed hydrogenation, Proceedings of the Second International Conference on Microreaction Technology, New Orleans, La., p. 152-153.

SUMMARY OF THE INVENTION

The present invention is a chemical reactor and method for catalytic chemical reactions having gas phase reactants. The chemical reactor has at least one reactor microchannel defining a bulk flow path through which at least one reactant passes, and at least one product, and a catalyst material wherein at least one reactant contacts the catalyst material and reacts to form at least one product. The improvement, according to the present invention is:

the catalyst material is in a porous structure having a porosity that permits molecular diffusion therein. The porous structure further has a length, a width and a thickness, the porous structure defining at least a portion of at least one wall of the at least one microchannel.

It is an object of the present invention to provide a chemical reactor for gas phase reactant catalytic reactions.

It is an object of the present invention to provide a method for gas phase reactant catalytic reactions.

A significant advantage of the present invention is the reduced pressure drop because the flow through the bulk flow path passes and contacts the porous structure but is not required to flow through the porous structure. Sufficient reaction still occurs because of the net flux through molecular diffusion into (gas phase reactant(s)) and out of (product(s))

the porous structure. Gas hourly space velocity is unexpectedly greater than 10,000 hr$^{-1}$ corresponding to residence time less than 1 second.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
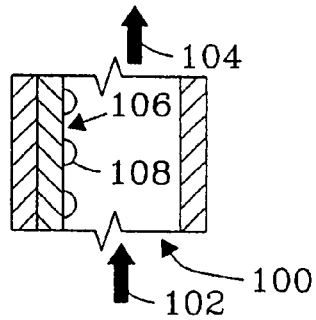
FIG. 1 is a cross section of a microchannel with a porous material therein.
Figure 2:
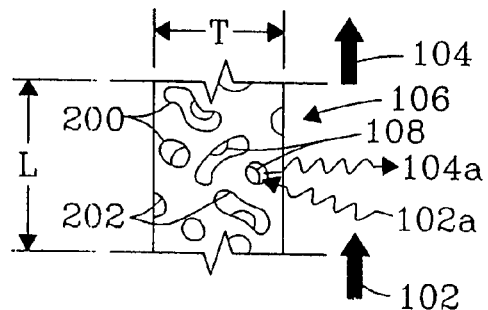
FIG. 2 is a cross section of the porous material with catalyst material thereon.

The present invention includes a chemical reactor for a catalytic chemical reaction with at least one gas phase reactant. The reactor (FIG. 1) has at least one reactor microchannel 100 for flow of at least one reactant 102 and at least one product 104. The improvement according to the present invention is that the reactor further has a porous structure 106 wherein the at least one reactant 102 reacts to form the at least one product 104. The porous structure 106 has pores 200 or porosity that resists bulk flow (reactant 102, product 104) therethrough and permits molecular diffusion (reactant portion 102a, product portion 104a) therein. The pores 200 are defined by porous surface area 202 upon which the catalyst material 108 resides. The porous material 106 further has a length L, a width (not shown) and a thickness T, and defines at least a portion of at least one wall of a bulk flow path through which the at least one reactant 102 passes.

A microchannel may be of any cross section defining the bulk flow path and is characterized by a characteristic dimension less than 1 mm.

In operation, the at least one reactant 102 enters the at least one reactor microchannel 100 in the bulk flow path, flowing past and in contact with the porous material 106. A portion of the at least one reactant 102a molecularly diffuses transversely into the porous catalyst 106 and reacts wherefrom the at least one product 104a molecularly diffuses transversely into the bulk flow path thereby transporting the at least one product 104 from the reactor.

Gas phase reactant catalytic reactions include but are not limited to steam reforming, $CO_2$ reforming partial oxidation, chlorination, fluorination, hydrogenation, dehydrogenation, nitration, water gas shift, reverse water gas shift, autothermal reforming, combustion, hydrocracking and hydrodesulferization. In steam reforming, gas hourly space velocity is greater than 10,000, preferably greater than 50,000, and may be about 100,000 corresponding to a residence time of less than 10 milliseconds.

In a preferred embodiment, the width of the bulk flow path is less than or equal to about 1 mm. The thickness T of the porous structure 106 is less than or equal to about 1 mm, and the length L preferably corresponds to a length of the microchannel of less than or equal to about 10 cm. The width of the porous structure 106 may vary but is at least about 20% and preferably at least about 50% of the circumference of the bulk flow path.

The porous material 106 may be a catalytic material, for example catalytic metal or ceramic in the form of a foam or a felt. Alternatively, the porous material 106 may be a porous support of a non-catalytic material with catalytic material 108 placed thereon. Porosity may be geometrically regular as in a honeycomb or parallel pore structure, or porosity may be geometrically tortuous or random. Porosity may range from about 30% to about 98% with average pore size less than the smallest microchannel dimension. Preferably pore size is from about 0.1 μm to about 200 μm permitting molecular diffusion.

Figure 3:
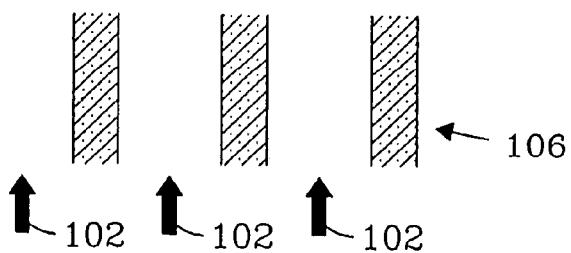
FIG. 3 is a cross section of microchannels defined by porous material.

The porous material 106 alone may define the microchannels as in FIG. 3. In this embodiment, it is possible to use a heat transfer fluid provided that the porous material 106 thickness T is sufficient to prevent mixing of the at least one reactant 102 or at least one product 104 with the heat transfer fluid. Alternatively, products may diffuse through the porous material 106 into a secondary fluid (not shown) to be collected.

Figure 4A:
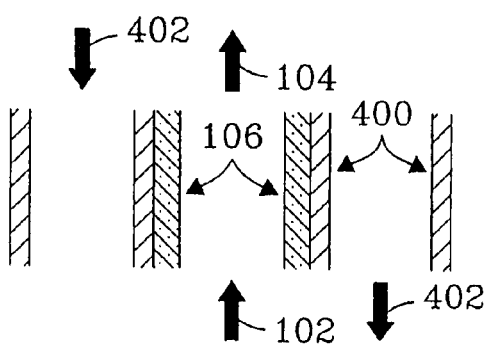
FIG. 4a is a cross section of a microchannel with porous material surrounded by heat transfer microchannels.
Figure 4B:
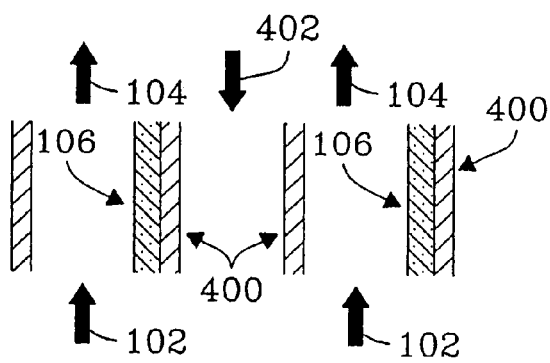
FIG. 4b is a cross section of microchannels with porous material with a heat transfer microchannel therebetween.

The porous material 106 may be placed adjacent a wall 400 of a non-porous material, for example metal, as in FIGS. 4a, 4b as an insert that may be removable. The use of non-porous walls 400 permits the use of a heat transfer fluid 402 that is different from the at least one reactant 102 and/or the at least one product 104. The heat transfer fluid 402 may flow countercurrent, cocurrent, crosscurrent or combinations thereof in relationship to the at least one reactant 102 and/or the at least one product 104.

Figure 5:
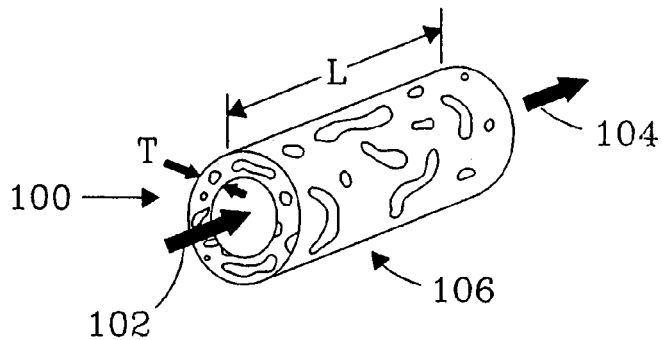
FIG. 5 is an isometric view of a cylindrical porous material.

The present invention includes cylindrical geometry as shown in FIG. 5. The inside diameter represents the microchannel and has a diameter of less than or equal to about 1 mm. The cylinder may be of any closed cross sectional shape. Multiple cylinders may be used. Cylinders may be formed as holes through a monolithic block of porous material 106. Alternate holes may be used for reactant/product and heat transfer fluid.

It is necessary that residence time of reactant(s) in the reactor be greater than the diffusion time for reactant(s) to contact the catalyst material. Pressure drop across the reactor preferably ranges from about 0.1 psi to about 5 psi.

Figure 6:
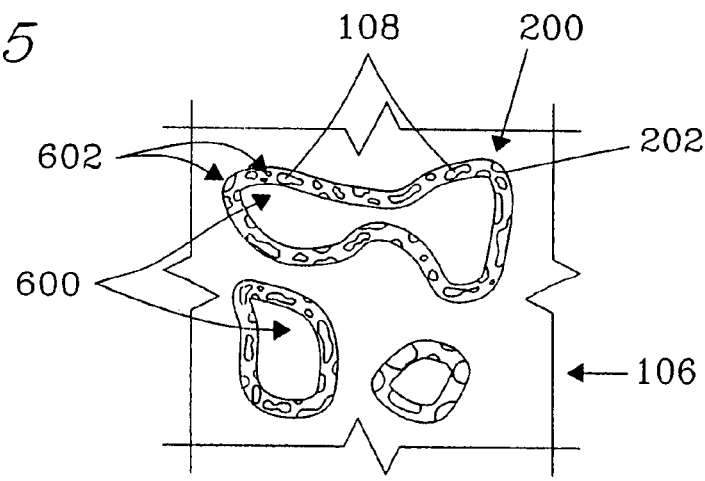
FIG. 6 is a cross section of the porous material with a second porous material on porous surface area.

Another embodiment is shown in FIG. 6 wherein the porous material 106 is a first porous material having a second porous material 600 on porosity surface area 202. The catalyst material 108 resides in the second pores 602. The second pores 602 are smaller than the pores 200, wherein the second pores 602 Knudsen diffusion occurs predominately.

EXAMPLE 1

An experiment was conducted to demonstrate the present invention using 1 microchannel for methane steam reforming. The microchannel was placed within a tube furnace to provide the required endothermic reaction heat. The microchannel was 1.52-cm long and 0.66-cm high. The width (or opening) of the microchannel was 0.0762-cm or 762-microns. The 0.0762-cm width included two porous structures that covered opposite walls and each had a width of 254-microns leaving a bulk flow path between the two porous structures of 254 microns. The porous structure contained a catalyst of 13.8%-Rh/6%-MgO/$Al_2O_3$ on a metal felt of stainless steel obtained from Technetics, Deland, Fla.

The methane inlet flowrate was 50.3-cc/min at standard conditions and the water (liquid) flowrate was 7.3 mL/hr, corresponding to a steam to carbon ratio of approximately 3:1. The methane and water were preheated to near the reaction temperature before entering the microchannel. Gas flow was in the bulk flow path between the porous structures had a Reynold's number less than about 500, and molecular diffusion brought reactants and products to and from each pore surface containing the catalyst.

Results are shown in Table E1-1 of performance as a function of temperature for very short residence times (less than 10-milliseconds).

TABLE 1-1

Performance data in single microchannel

| Temperature | Residence time (milliseconds) | Methane conversion (%) | CO selectivity (%) | Pressure drop (psi) |
|---|---|---|---|---|
| 650 | 2.3 | 54.2 | 42.3 | 0.05 |
| 700 | 2.2 | 70.9 | 50.9 | 0.13 |
| 800 | 2.0 | 88.9 | 65.4 | 0.45 |
| 900 | 1.8 | 89.6 | 74.6 | 1.00 |

EXAMPLE 2

Figure 7A:
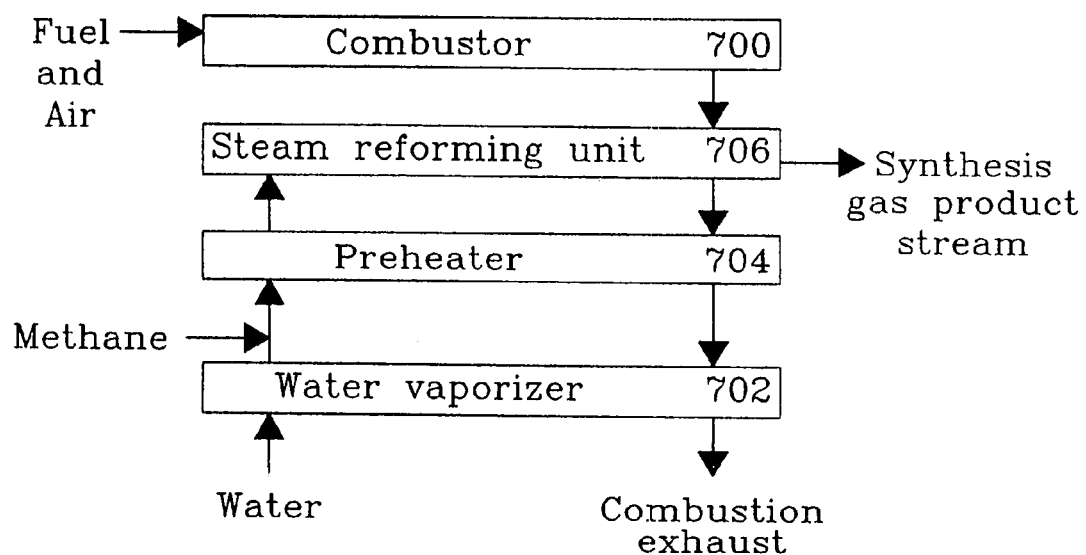
FIG. 7a is a block diagram of a microchannel steam reforming system.
Figure 7B:
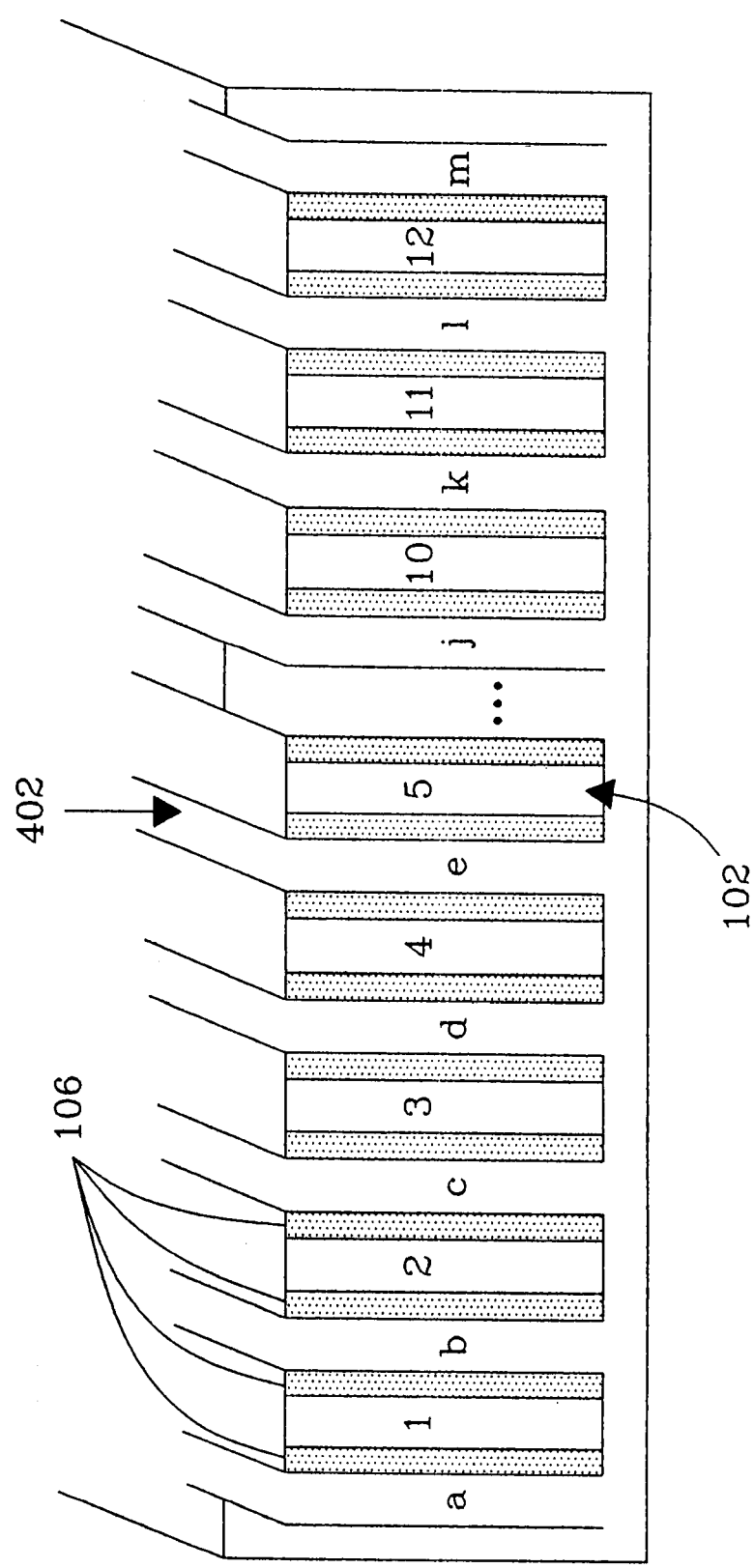
FIG. 7b is an end view of a microchannel reactor.

An experiment was conducted to demonstrate the present invention. The apparatus (FIG. 7a) included a fuel combustor 700, water vaporizer 702, a reactant preheat heat exchanger 704, and a steam-reforming unit 706. The steam reforming unit 706 was constructed with 12 parallel channels (FIG. 7b) 1, 2, 3 ... 12 each of length 2.79 cm, height 2.54 cm, and width of 750 microns. The porous structure 106 was felt metal of stainless steel with a porosity ranging from 35% to 90% obtained from Technetics, Orlando, Fla., having a width of about 250 micron. Pieces of metal felt with length and height nearly equal to the channel length and height were affixed to the walls on opposite sides of the channels leaving a bulk flow path of about 250 microns in each channel. The reactor microchannels were interspersed with heat exchange channels a, b, c ... m to provide the endothermic reaction heat. The adjacent (and interleaved) parallel heat exchange microchannels (13 total) were hermetically sealed with respect to the reaction microchannels to prevent reactant by-pass around the catalyst material. The heat exchange microchannels had nearly the same height and length as the reaction microchannels. The width of each heat exchange channel was 508-microns. The heat exchange fluid 402 within the steam-reforming unit was the combustion product of hydrogen (20 SLPM feed) and excess air (168 SLPM feed). The combustion product 402 was fed in a cross-flow configuration to the direction of reactant flow 102.

Reactants were methane and water in the form of steam at flow rates of 1 SLPM and 2.81-SLPM (or 2.26-ml/min liquid) respectively. Gas hourly space velocity was approximately 100,000 $hr^{-1}$ corresponding to a residence time of 9.2 milliseconds. Reactor inlet temperature was 736° C. receiving a mixture of methane and steam. The pressure drop through the microchannel steam-reforming unit was less than 0.6 psi.

Product conversion of methane was 79% and selectivity to CO was 65%.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. Apparatus, comprising:
a steam reforming unit, comprising
plural reaction microchannels wherein the plural reaction microchannels comprise a bulk flow channel adjacent to a porous catalyst;
and further including at least one of: a fuel combustor, a water vaporizer, and a reactant preheat heat exchanger, that is adapted to operate in conjunction with the steam reforming unit.

2. The apparatus of claim 1 comprising plural heat exchange channels interleaved with the plural reaction microchannels.

3. The apparatus of claim 2 wherein the apparatus includes a fuel combustor, a water vaporizer, and a reactant preheat heat exchanger, that are adapted to operate in conjunction with the steam reforming unit.

4. The apparatus of claim 2 wherein the porous catalyst comprises a metal felt support.

5. The apparatus of claim 2 wherein the bulk flow channel has a width of 1 mm or less.

6. The apparatus of claim 2 wherein the porous catalyst has a thickness of 1 mm or less.

7. The apparatus of claim 6 wherein the apparatus includes a fuel combustor, a water vaporizer, and a reactant preheat heat exchanger, that are adapted to operate in conjunction with the steam reforming unit.

* * * * *